H. C. ROUTERY.
FEEDING UTENSIL.
APPLICATION FILED DEC. 16, 1912.
1,128,190.
Patented Feb. 9, 1915.
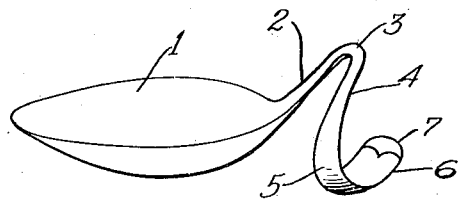
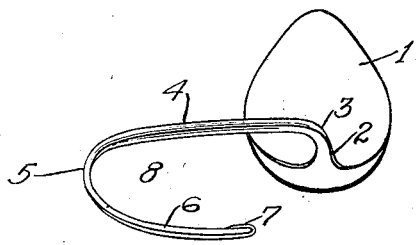
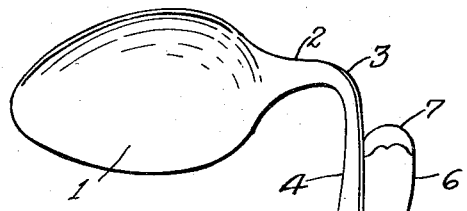
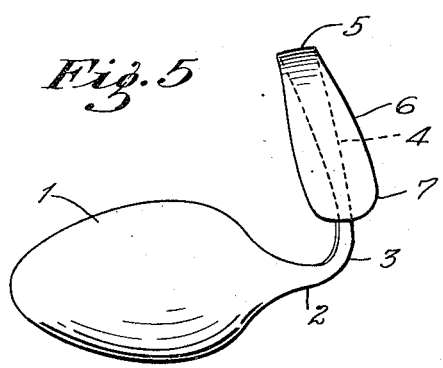
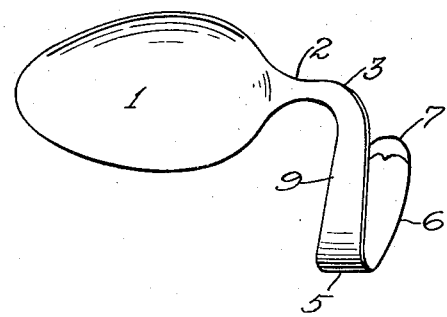
Witnesses
Thor Sjöberg
L. Belle Rice
Inventor
Herbert C. Routery
by James T. Townsend
his Atty.

UNITED STATES PATENT OFFICE.

HERBERT C. ROUTERY, OF LOS ANGELES, CALIFORNIA.

FEEDING UTENSIL.

1,128,190. Specification of Letters Patent. Patented Feb. 9, 1915.

Application filed December 16, 1912. Serial No. 737,120.

*To all whom it may concern:*

Be it known that I, HERBERT C. ROUTERY, a subject of the King of Great Britain, residing at Los Angeles, in the county of Los Angeles and State of California, have invented a new and useful Feeding Utensil, of which the following is a specification.

This invention relates more particularly to the utensils known as baby spoons, but is also applicable to forks.

An object of this invention is to provide a feeding utensil that affords improved means for holding the operative part thereof, as the bowl or the fork body, securely in the hand of an infant with small liability that the child will drop the utensil through clumsiness.

An object of this invention is to provide means to afford leverage to resist the downward tilting of the spoon bowl or fork tines toward the tip thereof, combined with means for securing the handle to the hand of the child, so that the inclination to drop the utensil will be lessened, and the certainty of holding the utensil will be increased; and this is effected by providing a hook-like lateral handle extension, the same being connected to the body of the implement, to wit: the bowl of a spoon or the tine body of a fork, by a shank of suitable length extending from the heel of the utensil body.

A feature of the invention consists in the connection of such lateral hook-like handle extension with the body of the utensil by a shank extending at an angle of about 45° with the top plane of said body, thus carrying the handle extension above the level of the bowl or tines of the utensil and enabling the child to insert said bowl or tines into the food to be conveyed to the mouth, without bringing the fingers into such food.

The construction of the spoon or fork is such that a child using the same will be compelled to handle it with the hand for which it is constructed; thus to assist a child to use the right or the left hand, as the case may be, for such purpose to the exclusion of the other hand. This feature of construction, however, is not regarded as a part of the invention and it will be sufficient to illustrate the invention as applied in a right-hand baby spoon; the application in a left-hand spoon and in a fork being obvious therefrom.

The accompanying drawings illustrate the invention.

Figure 1 is a perspective view of a right-hand baby spoon embodying the invention in one form. Fig. 2 is a rear elevation of the same. Fig. 3 is an elevation from the right of Fig. 1; the spoon being tilted to view the handle edgewise. Fig. 4 is a top plan of the spoon. Fig. 5 is a bottom plan. Fig. 6 is a plan of a form having a broader upper handle limb than is shown in the other views.

The bowl or body 1 of the spoon may be of any suitable form, and the shank 2 of the handle preferably extends aslant upwardly therefrom at an angle of about 45 degrees, more or less, for a short distance, to wit: about three-fourths of an inch, more or less, and the handle is there formed in a bend 3 from which the intermediate or upper limb 4 extends aslant downward rearwardly at an acute angle with the longitudinal axis of the bowl or body for a distance of an inch and one-half, more or less, where it is continued in a downward and forward curve 5 and thence extends forwardly and downwardly to the right under the upper limb to form the lower limb 6 of a widely open hook which terminates in a slight upwardly deflected tip 7. The upper and lower limbs 4 and 6 diverge from each other and form the bend 5 by which they are connected. By longitudinal axis of the bowl or body is meant that axis thereof, the extension of which passes longitudinally through or along the shank. By this arrangement of the handle, there is formed a forefinger receiving space 8 that is nearly at a right angle to the produced axis of the bowl to allow the forefinger to be inserted therethrough and to extend nearly in parallelism with the bowl, and when the forefinger is bent at the second joint and inserted through the handle, the thumb will extend along the upper limb 4 to grip said upper limb between the thumb and forefinger, said limb extending across the second joint of the forefinger, while the lower limb 6 is naturally gripped between the second joint of the forefinger and the second finger, thus giving a firm double grip upon the handle by the thumb and the forefinger and second finger, the thumb meanwhile being in such angular relation to the bowl that when the child conveys the spoon to the mouth, the tip of the spoon will readily enter the mouth so that the child may take the contents of the spoon into its mouth without any danger of spilling the same. It is thus seen that the handle of the spoon is formed in a hook-like loop, substantially normal to the axis of the bowl of the spoon and the shank of the handle. By reason of the diverging arrangement of the upper and lower limbs a firm grip is afforded between the thumb and the second finger pressing the upper and lower surfaces of the handle, while the forefinger is seated in the bend between said limbs to resist any tendency to drop down. The lower limb is broadened after the manner of the ends of spoon and fork handles, and the inner limb may be narrow, as shown in Figs. 1 to 5, or may be broader and flat, as shown at 9 in Fig. 6. The object of slanting the shank 2 upward from the plane of the bowl at an angle of 45 degrees, more or less, is to give space for the fingers so that the spoon may be dipped into food without contacting the fingers with the food.

I claim:

A feeding implement comprising a body, a shank, and a looped handle extending substantially at right angles to and to one side of that axis of said body which passes through said shank, the ends of said handle lying one below the other.

In testimony whereof I have hereunto set my hand at Los Angeles, California, this 9th day of December, 1912.

HERBERT C. ROUTERY.

In presence of—
 JAMES R. TOWNSEND,
 L. BELLE RICE.

Copies of this patent may be obtained for five cents each, by addressing the "Commissioner of Patents, Washington, D. C."